Patented July 21, 1942

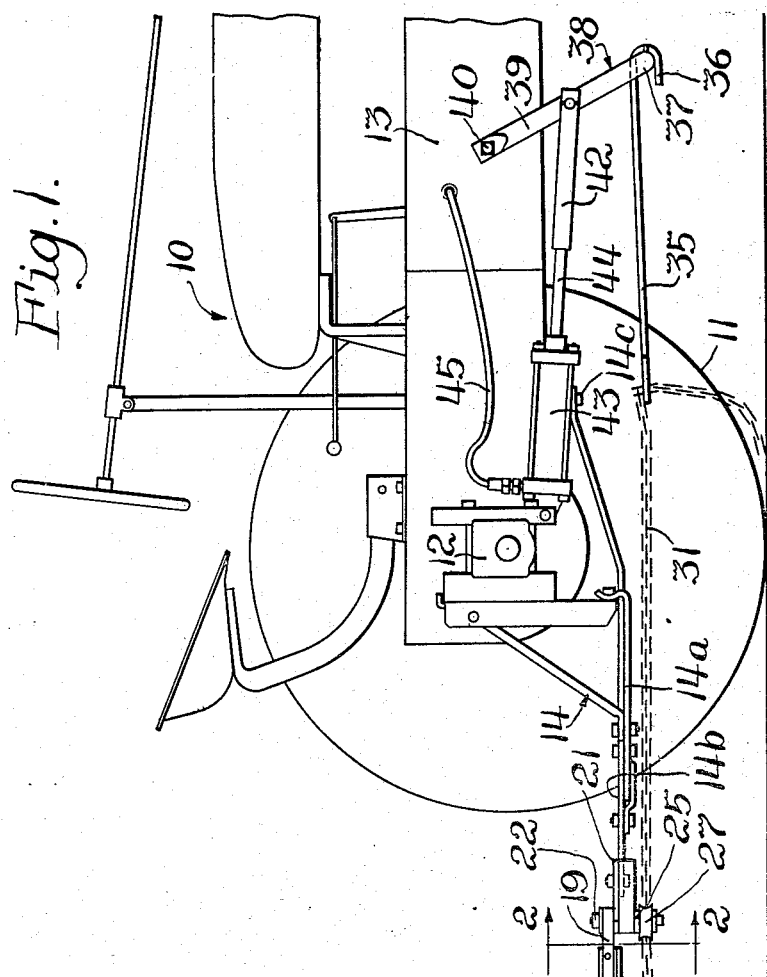
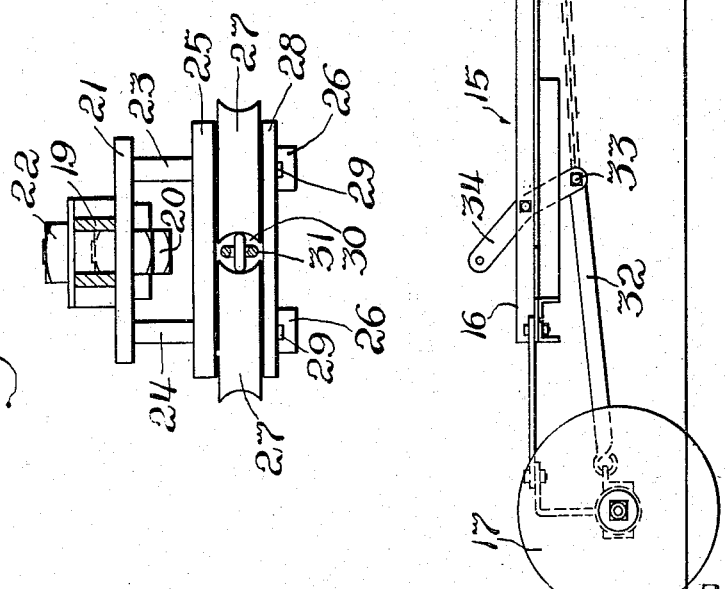

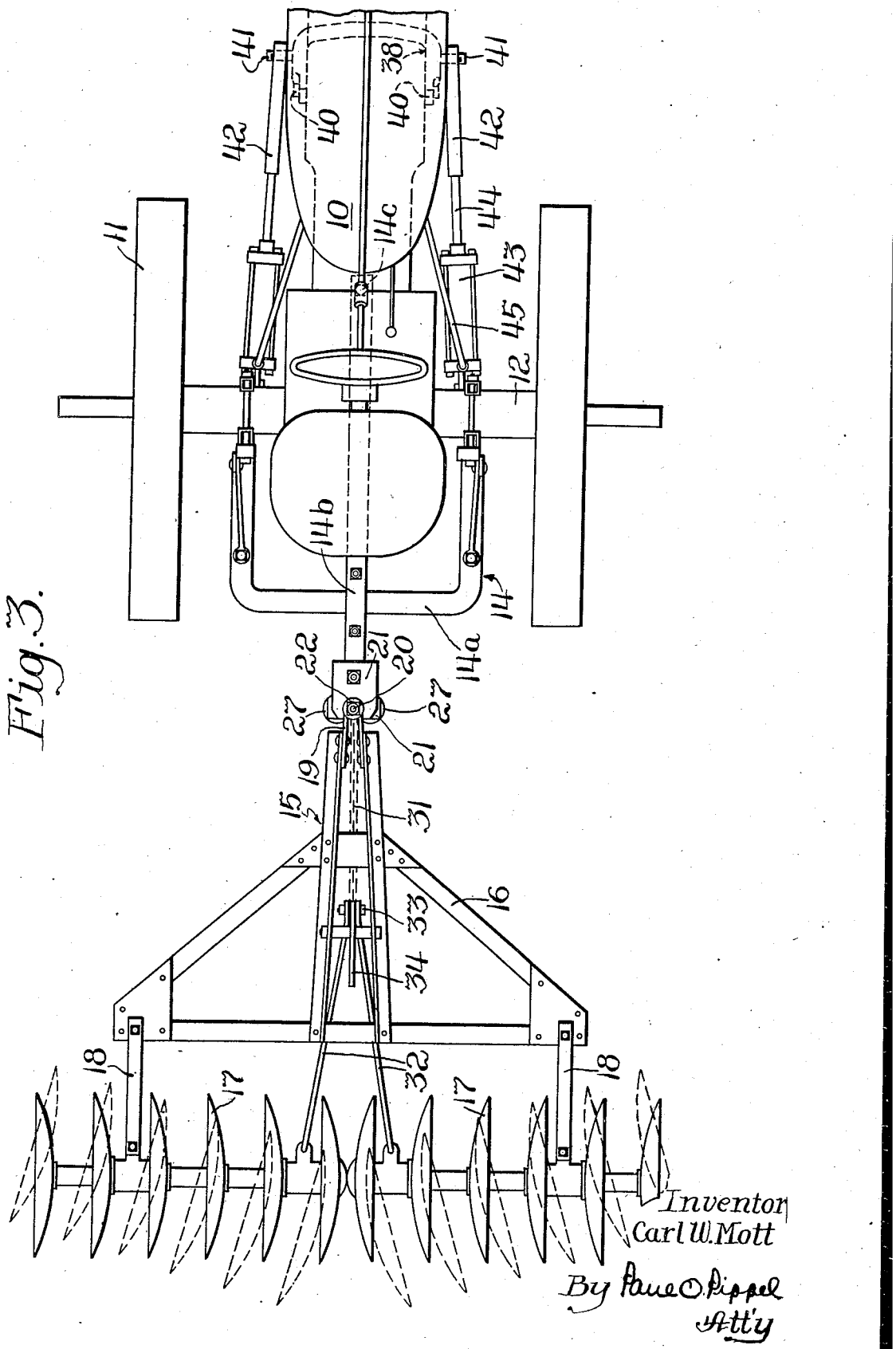

2,290,244

UNITED STATES PATENT OFFICE 2,290,244

IMPLEMENT ATTACHMENT FOR TRACTORS

Carl W. Mott, La Grange, Ill., assignor to International Harvester Company, a corporation of New Jersey Application February 28, 1940, Serial No. 321,154

17 Claims. (Cl. 55—81)

This invention relates to an implement attachment for a tractor. More specifically, it relates to mechanism for adjusting a tractor-attached implement by the power of the tractor.

It is frequently the practice in the case of harrows attached at the rear of tractors to shift the harrow gangs from an angled position to a straight transport position either by a hand crank on the tractor or by backing of the tractor. At certain times, when the harrow is being pulled through soft ground in which the tractor has insufficient traction to pull the harrow, it is necessary to take the harrow gangs out of angle, so that the tractor may get out of the soft ground. It may be inconvenient and almost impossible to shift the gangs to a straight transport position by means of a hand crank. It is impossible to straighten the gangs by backing of the tractor. Consequently, straightening of the gangs by means of power of the tractor is of considerable advantage.

An object of the present invention is an improved implement attachment for a tractor.

Another object is the provision of mechanism for adjustment by power of a tractor of an implement attached to the tractor.

A further object is to provide means for adjustment by power of a tractor of the gangs of a harrow attached to the tractor.

According to the present invention, an implement such as a harrow is attached to the draw-bar of a tractor. A U-shaped member is pivotally connected to the side of a tractor and extends to a point considerably beneath the tractor. A power-actuated device is connected to the U-shaped member, and there is also a connection between the U-shaped member and the gangs of the harrow, so that, by power of the tractor applied through the power actuated mechanism and U-shaped member, the gangs of the harrow may be adjusted.

In the drawings—

Figure 1 is a side view, showing the rear portion of a tractor with one wheel removed and a harrow attached at the rear of the tractor;

Figure 2 is a section taken along the line 2—2 of Figure 1;

Figure 3 is a plan view of the tractor and the harrow; and,

Figure 4 is a detail view of a member forming part of the means for adjusting the harrow.

The reference character 10 designates a tractor of which only the rear part is shown. This tractor has rear wheels 11, a rear axle 12, and a body portion 13. A draw-bar structure 14 is connected at the rear of the tractor and comprises a rigid draw-bar 14a of U-shape and a swinging draw-bar 14b pivotally connected at its forward end to the under side of the tractor body 13 at 14c and slidably supported near its rear end on the rigid draw-bar 14a. A harrow 15, positioned at the rear of the tractor, has a frame 16 and a pair of gangs 17 movably connected by links 18 to the frame 16. The frame is pivotally connected to the swinging draw-bar 14b by means of a U-shaped strap 19 secured to the frame, a plate 21 secured to the draw-bar 14b, and a bolt 20 passing through the U-shaped member 19 and through the plate 21. A nut 22 holds the bolt in place.

Members 23 and 24 are secured to the plate 21 and extend downwardly therefrom and have in turn secured at their lower ends a plate 25. Pins 26 extend downwardly from the plate 25 and have rollers 27 rotatably mounted thereon. A plate 28, held on the pins 26 by cotter pins 29, holds the rollers 27 on the pins 26.

It is to be noted from Figure 2 that the rollers 27 are grooved, so that along with the plates 28 and 25 they enclose a space 30 through which a chain 31 extends. As seen in Figures 3 and 4, the chain is secured at one end to links 32 by means of a bolt 33 supported from the harrow frame 16 by means of a lever 34. The links 32 are connected to the inner ends of the harrow gangs 17. The forward end of the chain 31 extends through an opening in a member 35 in such a way that the member 35 is securable at any point of the length of the chain 31. The member 35 has a hook portion 36 which extends over a base portion 37 of a U-shaped member 38 which is pivotally secured by its ends 39 to opposite sides of the tractor body 13 by means of bolts 40. The sides of the U-shaped member 38 carry projections 41 to which are pivotally secured sleeves 42 on opposite sides of the tractor. The sleeves 42 form parts of power devices at opposite sides of the tractor of the type shown in the patent to Lindgren No. 2,156,570, May 2, 1939. Each power device comprises essentially a cylinder 43 having a sleeve extension 44 and a piston, not shown, within the cylinder extending through the sleeve 44 and secured to the sleeve 42. The sleeve 42 embraces the sleeve extension 44. This power device is more fully shown in the aforementioned Lindgren patent, and no further description is given here, since the device per se forms no part of the present invention. The device is actuated by means of fluid supplied under pressure through a pipe 45 by means of the power of the engine. When it is desired to shift the gangs 17 from the dotted line position to the full line position, fluid under pressure is supplied through the pipe 45. This causes the pistons of each power device to move in the cylinders 43 in a direction toward the U-shaped member 38. Accordingly, the U-shaped member is moved angularly forwardly of the tractor and exerts, through the member 35, the chain 31, and the links 32, a forward pull on the inner ends of the gangs 17 such as to move these gangs into the straight transport position shown in full lines in Figure 3. Straightening of the harrow gangs is accomplished in this manner at any time desired and is particularly advantageous when the harrow and tractor are in soft ground. In this instance, it may be inconvenient or impossible to straighten the gangs by hand or by backing of the harrow. When the gangs have been straightened by the power of the tractor as above described, the drag on the tractor is reduced sufficiently so that the tractor may move out of the soft ground easily.

As has been previously pointed out, the rollers 27 and plates 25 and 28 enclose a space 30 through which the chain 31 extends. This space is approximately in line with the pivot axis of the harrow with respect to the swinging drawbar 14b, this pivot axis being the bolt 20. Consequently, when the harrow and the tractor are turned, and there is pivoting of the harrow with respect to the tractor, and of the swinging drawbar with respect to the tractor, the chain 31 is kept taut. It will be observed from Figure 1 that the member 35, the chain 31, and the links 32 all extend at about the same low level near the ground and, consequently, can act at approximately the same height above the ground as the point at which the links 32 are connected to the gangs 17. The low position of the chain 31 and the member 35 is, of course, permitted by the U-shaped member 38, which is connected to the sides of the tractor body 13 and extends downwardly to a point considerably below the tractor body. In addition to the fact that the U-shaped member 38 permits the application of force to the front gangs at the level of the front gangs, it is to be pointed out that the transmitting of force at this low level is of advantage because the parts to which the force is transmitted extend considerably below the axle of the tractor and thus avoid entangling with the tractor axle, the draw-bar, and the parts which support the draw-bar.

It will be apparent from the foregoing description that a new and novel means has been described for adjustment by the power of a tractor of an implement attached at the rear of the tractor. Although the implement shown as attached to the tractor in the drawings is a harrow, it will be obvious that other types of implements may be attached to the tractor and be adjusted in a similar manner.

The intention is to limit the invention only within the terms of the appended claims.

What is claimed is:

1. In combination, a tractor having a rear axle and a power plant, an implement connected to the tractor at the rear thereof, and means for adjusting the implement comprising a member mounted on the tractor for shifting movement with respect to the tractor and extending to a point below the tractor and in advance of the rear axle, means connecting the power plant and the member, means connecting the implement and the member at a point below the tractor in front of the rear axle, said means being supported adjacent the connection of the implement and the tractor.

2. In combination, a tractor having a rear axle and a power plant, an implement connected at the rear thereof, and means for adjusting the implement comprising a member mounted in front of the rear axle for movement longitudinally of the tractor and extending to a point in front of the rear axle and below the tractor, means connecting the implement and the member at a point in front of the rear axle and below the tractor and supported adjacent the connection of the implement with the tractor, and means connecting the power plant and the member.

3. In combination, a tractor having a rear axle and a power plant, an implement pivotally connected to the tractor at the rear thereof, and means for adjusting the implement comprising a member pivotally mounted on the tractor on a transverse axis in front of the rear axle and extending downwardly to a point in front of the rear axle below the tractor for shifting movement with respect thereto, means connecting the implement and a point on the member below the tractor in front of the rear axle and supported adjacent the pivotal connection of the implement with the tractor, and means connecting the member and the power plant.

4. In combination, a tractor having a body, a rear axle, and a power plant, an implement pivotally connected to the tractor at the rear thereof, and means for adjusting the implement comprising means connected on opposite sides of the tractor body on a transverse axis in front of the rear axle and extending beneath the tractor in front of the rear axle and being shiftable longitudinally of the tractor, means connecting the implement and a point of the last-mentioned means beneath the tractor in front of the rear axle and supported adjacent the pivotal connection of the implement and the tractor, and means connecting the power plant and the said last-mentioned means.

5. In combination, a tractor having a body, a rear axle, and a power plant, an implement pivotally connected to the tractor at the rear thereof, and means for adjusting the implement comprising a U-shaped member extending beneath the tractor in front of the rear axle and being connected at its ends on opposite sides of the tractor body on a transverse axis in front of the rear axle, means connecting the implement and the portion of the U-shaped member extending beneath the tractor and including a flexible part supported adjacent the pivotal connection of the tractor and the implement, and means connecting the power plant and the U-shaped member.

6. In combination, a tractor having a rear axle and a power plant, an implement connected at the rear thereof, and means for adjusting the implement, comprising means mounted on the tractor and extending to a point below the tractor near the ground in front of the rear axle, means connecting a point of the last-mentioned means below the tractor near the ground in front of the rear axle and a point on the implement near the ground and supported at a point below and adjacent the connection of the implement with the tractor.

7. In combination, a tractor having a power plant, a harrow comprising a frame pivotally connected to the tractor and a gang movably connected to the frame, a pair of rollers positioned adjacent the pivotal connection of the tractor and harrow frame and means for adjusting the gang horizontally with respect to the frame comprising means connected to the tractor and extending downwardly to a point below the tractor, means connecting a point on the last-mentioned means beneath the tractor and the harrow gang and passing through the space enclosed by the rollers, and means connecting the said last-mentioned means and the power plant.

8. In combination, a tractor having a power plant, a harrow connected at the rear of the tractor and having a gang, rollers positioned beneath the connection of the harrow and the tractor, and means for adjusting the harrow gang comprising means mounted on the tractor for movement lengthwise thereof, means connecting the power plant and the last-mentioned means, and means connecting the harrow gang and the said last-mentioned means and passing between the rollers.

9. In combination, a tractor having a rear axle and a power plant, a harrow connected at the rear of the tractor and having a gang, rollers positioned beneath the connection of the tractor and the harrow at substantially the level of the harrow gang and enclosing a space, and means for adjusting the harrow gang comprising a member pivotally connected to the tractor on a transverse axis in front of the rear axle and extending beneath the tractor in front of the rear axle, means connecting the harrow gang and a point on the member in front of the rear axle at substantially the level of the harrow gang and passing through the space enclosed by the rollers, and means connecting the member and the power plant.

10. In combination, a tractor having a rear axle and a power plant, a harrow pivotally connected at the rear of the tractor and having a gang, means for adjusting the gang comprising a member mounted on the tractor in front of the rear axle for movement lengthwise of the tractor and having a portion below the tractor in front of the rear axle at the level of the harrow gang, means connecting the power plant and the member, and means connecting the said portion of the member and the harrow, and means slidably supporting the last-mentioned means below the pivotal connection of the tractor and the harrow at substantially the level of the harrow gang.

11. In combination, a tractor having a power plant, a harrow having a gang, a draw-bar pivotally connected at one end to the tractor and at the other end to the harrow, means connecting the power plant and the harrow gang for adjusting the gang, and retaining means slidably holding the last-mentioned means for lengthwise movement at a point adjacent the pivotal connection of the draw-bar and the harrow, said means comprising a pair of rollers carried by the draw-bar beneath the connection of the draw-bar and the harrow and enclosing a space through which the means connecting the tractor power plant and the harrow gang passes.

12. In combination, a tractor having a rear axle and a power plant, a harrow having a gang, a draw-bar pivotally connected at one end to the tractor and at the other end to the harrow, a pair of rollers supported beneath the connection of the harrow and the draw-bar and enclosing a space, and means for adjusting the harrow gang comprising a member mounted on the tractor in front of the rear axle for longitudinal movement with respect to the tractor and having a portion beneath the tractor in front of the rear axle, means connecting the said portion and the harrow gang, and means connecting the power plant and the member.

13. In combination, a tractor having a body and a power plant, an implement connected to the tractor, a U-shaped member extending beneath the tractor body and pivotally connected at its ends to the sides of the tractor body, means connecting the implement and a point on the U-shaped member beneath the tractor body, and means connecting the tractor power plant and the U-shaped member for shifting the member and thereby effecting adjustment of the implement.

14. In combination, a tractor having a body and a power plant, a U-shaped member extending beneath the tractor body and pivotally connected at its ends to the sides of the tractor body, and means connecting the tractor power plant and the sides of the U-shaped member for shifting the member with respect to the tractor.

15. In combination, a tractor having a body and a power plant, a force-transmitting means movably mounted on the side of the tractor body and extending beneath the body, and means connecting the tractor power plant and a point on the force-transmitting means at the side of the body for shifting the means with respect to the tractor body.

16. In combination, a tractor having a body and a power plant, an implement connected to the tractor, a U-shaped member embracing the tractor body and pivotally connected at its ends to the tractor body, means connecting the base of the U-shaped member and the implement, and means connecting the tractor power plant and the sides of the U-shaped member for shifting the member and thereby adjusting the implement.

17. In combination, a tractor having a body and a power plant, an implement connected at the rear of the tractor, a U-shaped member extending beneath the tractor body and pivotally connected at its ends to the sides of the body, means connecting the implement and a point on the U-shaped member beneath the body, a pair of fluid-power devices positioned at opposite sides of the tractor body, each device comprising a cylinder and a piston movably mounted therein, means connecting the devices and the sides of the U-shaped member, means connecting the tractor power plant and the fluid-power devices for supplying fluid under pressure to the devices so as to shift the U-shaped member and thereby to adjust the implement.

CARL W. MOTT.